Nov. 5, 1968  W. STELZER  3,408,814
POWER OPERATED BRAKE PRESSURE PROPORTIONING
AND BOOSTING DEVICE
Filed Nov. 2, 1966  2 Sheets-Sheet 1
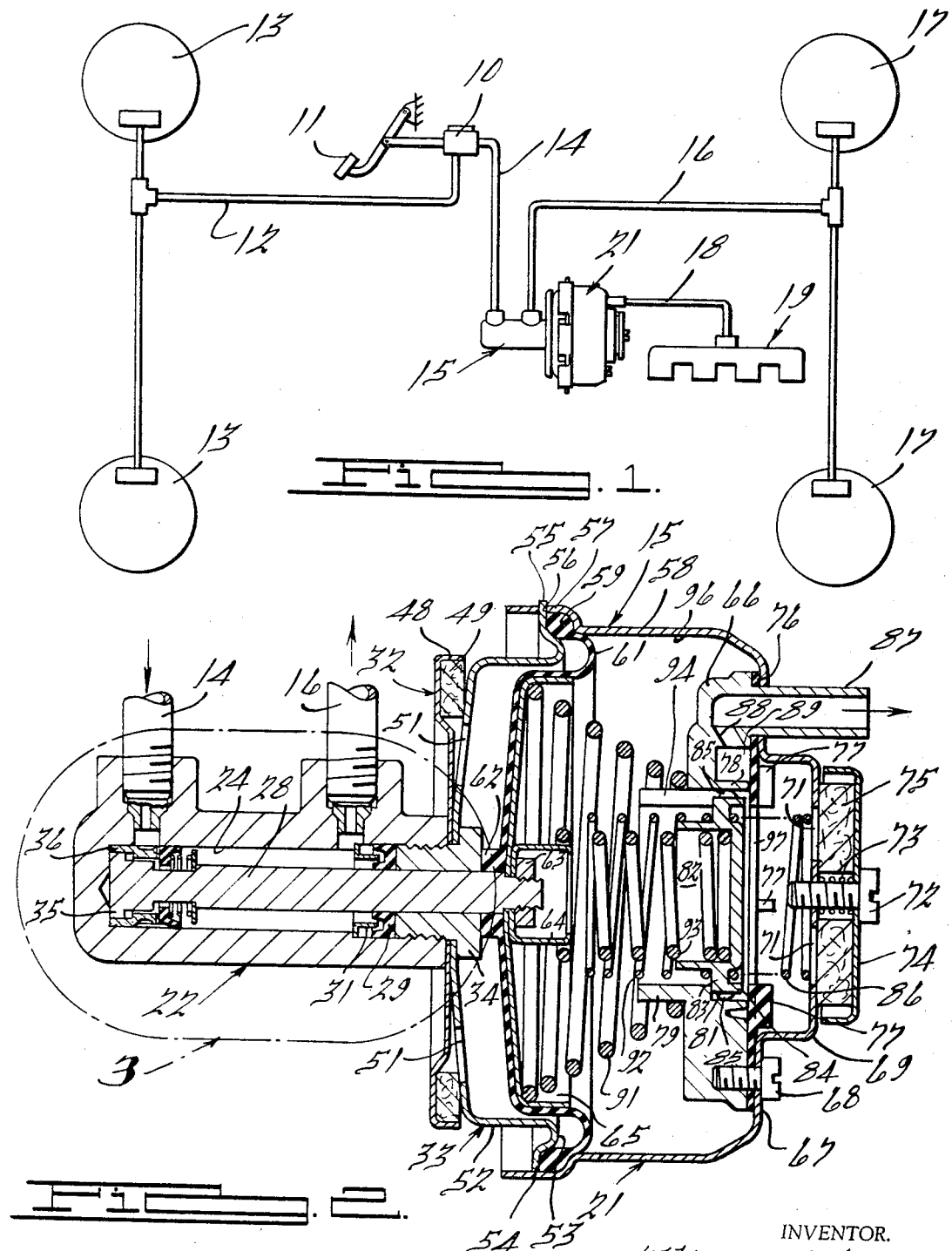
INVENTOR.
William Stelzer
BY
Harness, Dickey & Pierce
ATTORNEYS.

Nov. 5, 1968     W. STELZER     3,408,814
POWER OPERATED BRAKE PRESSURE PROPORTIONING
AND BOOSTING DEVICE
Filed Nov. 2, 1966     2 Sheets-Sheet 2
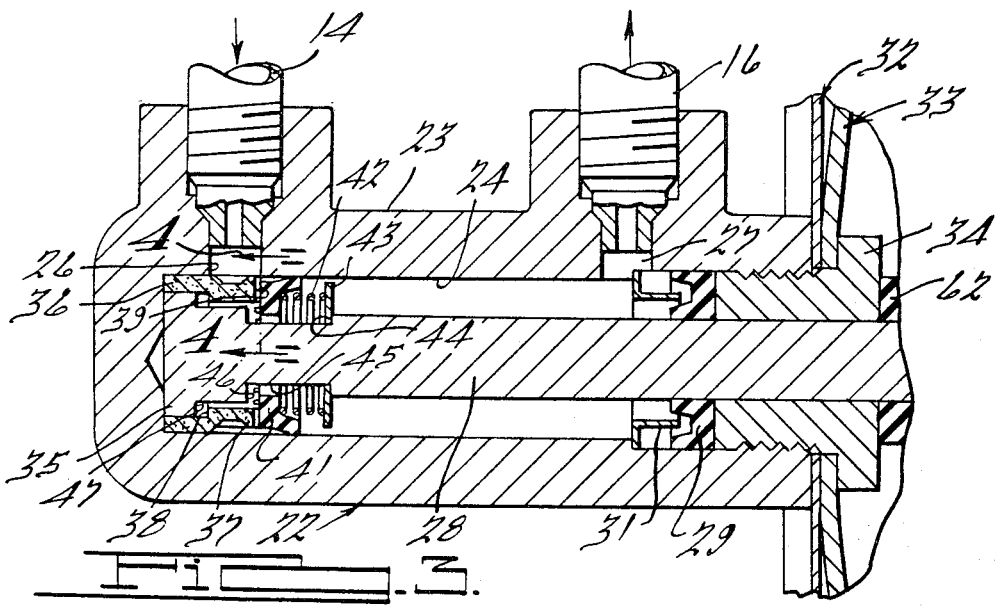
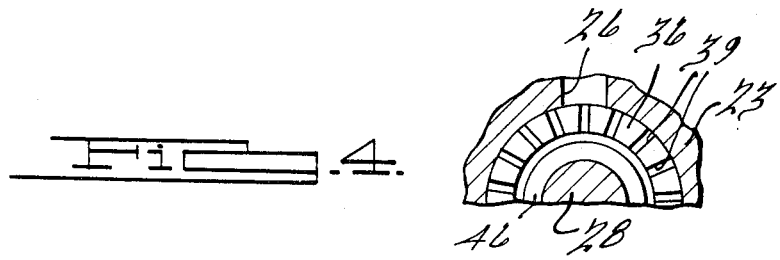
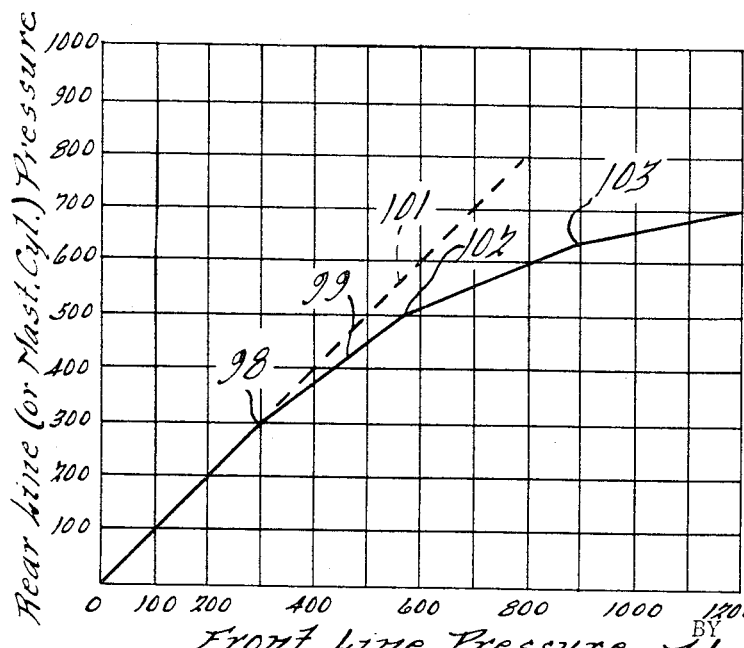
INVENTOR.
William Stelzer
BY
James, Dickey & Pierce
ATTORNEYS.

United States Patent Office 3,408,814
Patented Nov. 5, 1968

3,408,814
POWER OPERATED BRAKE PRESSURE PROPORTIONING AND BOOSTING DEVICE
William Stelzer, Bloomfield Hills, Mich., assignor to Kelsey-Hayes Company, a corporation of Delaware
Filed Nov. 2, 1966, Ser. No. 591,578
11 Claims. (Cl. 60—54.5)

ABSTRACT OF THE DISCLOSURE

A hydraulic brake system using a brake pedal and master cylinder applies pressure directly to one set of front or rear brake cylinders and applies pressure to the cylinders of the other set of wheels in stages through a proportioning device and a motor operated thereby to increase the pressure on the last said brake cylinders in accordance with an ideal curve.

---

In the present invention, a master cylinder applies hydraulic pressure to cylinders of the brakes of the rear wheels and to a booster device which applies pressure to the cylinders of the brakes of the front wheels in increasing amount as the master cylinder pressure is increased. A housing has an inlet opening from a master cylinder and an outlet opening to the cylinders of the brakes of the front wheels. The housing has a central bore containing a piston having a large head at the end in which the fluid from the master cylinder is admitted. A sleeve is positioned around the piston for engagement with the head. An elastomeric seal surrounds the piston forwardly of the sleeve and is also engageable with the piston head. However, the sleeve normally holds the seal away from the head to leave a passage for the flow of fluid around the piston from the inlet to the outlet. As the pressure builds up at the inlet, the piston will be moved relative to the sleeve to sealingly engage the seal and then the piston, the sleeve and the seal will move away from the inlet as a unit to displace fluid to the outlet and to the conduits leading to the cylinders of the front brakes at a pressure greater than the pressure of the master cylinder and the rear brake cylinders. When the pressure from the master cylinder increases sufficiently, a fluid motor is actuated to apply a force to the piston assisting its movement toward the outlet. A central valve regulates the fluid motor and is responsive to force acting against the piston from the inlet. The greater the inlet pressure the greater will be the amount of power assist. The fluid motor is illustrated as a vacuum operated diaphragm, and the control valve is biased to a closed position by the vacuum in the vacuum chamber. However, the control valve is biased open by one or more springs seated against the diaphragm. By utilizing two such springs which successively engage the control valve, a two-stage control of the valve is accomplished with the front brake pressure increased at a greater rate during the second stage.

Accordingly, the main objects of the invention are: to provide a fluid motor connected to a pressure proportioning piston which applies a booster force to the piston; to control the fluid motor in accordance with the inlet pressure acting on the pressure proportioning piston, to vary the power delivered to the piston by balancing the forces of springs and vacuum pressure acting on a control valve, to provide a two-stage operation of the fluid motor, and in general, to provide a vacuum motor for a booster which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a schematic view of a fluid system for applying differential pressure to the cylinders of the front and rear brakes of the vehicle;

FIGURE 2 is a sectional view of a booster device with a vacuum motor applied thereto;

FIGURE 3 is an enlarged view of the structure illustrated in FIGURE 1, as viewed in the ellipse 3 thereof;

FIGURE 4 is an enlarged broken sectional view of the structure illustrated in FIGURE 3, taken on the line 4—4 thereof, and FIGURE 5 is a graph showing the change in pressure in the cylinders of the front and rear brakes as the master cylinder pressure changes.

A master cylinder 10 is operated by a foot pedal 11 to apply hydraulic pressure to the fluid in a circuit 12 to the cylinders of the rear wheels 13 and to a conduit 14 to a vacuum operated booster device 15 of the present invention. A conduit 16 from the device 15 applies pressure to the hydraulic fluid in the cylinders of the brakes of the front wheels 17. A vacuum conduit 18 is connected to a source of vacuum herein illustrated to the intake manifold 19 of an autocycle engine. The conduit 18 is joined to a vacuum motor 21 which assists in boosting the pressure on the hydraulic fluid in the conduit 16 to the front wheel brake cylinders.

Referring more specifically to FIGURE 2, the device 15 of the present invention embodies a pressure proportioning device 22, the operation of which is augmented by a vacuum motor 21. Referring to FIGURES 3 and 4, the proportioning device 22, embodies a housing 23 having a central bore 24 connected to the conduit 14 through a passageway 26. A pasageway 27 joins the bore 24 to the conduit 16. A piston 28 is sealed within the bore by sealing element 29 retained in position by a collar 31 when secured to stampings 32 and 33 by a threaded plug 34. The piston 28 has an enlarged head 35 which is disposed within a sleeve 36 having an inward offset section 37 forming a shoulder 38 which is engageable by the head 35. The bottom face of the sleeve 36 is provided with a plurality of radial slots 39, as clearly illustrated in FIGURE 4. The bottom face of the sleeve 36 is in engagement with an elastomeric seal 41 which is urged upwardly thereagainst by a spring 42 having one end in engagement with a washer 43 of the split spring type which rests upon a shoulder 44 of the piston 28. The reduced area 45 of the piston 28 forms a shoulder 46 which is in position to engage the seal 41 and shuts off the flow of fluid from the conduit 14 to the bore 24. When the piston 28 is moved to the right, as viewed in FIGURE 3, the shoulder 46 will engage the elastomeric seal 41 and a shoulder 47 of the head 35 will engage the sleeve 36 to have the seal 41, the sleeve 36 and head 35 all move as a unit to increase the pressure on the fluid within the bore 24.

The stamping 32 has a downwardly extending flange 48 to which an air filtering pad 49 is secured and disposed in engagement with the stamping 33 which has apertures 51 for the intake of air which must pass through the pad 49 and thereby be filtered before entering the left-hand side of the vacuum motor 21. The stamping 33 has a cylindrical wall 52 provided with a reversely bent section 53 and an outwardly extending flange 54. The flange 54 has fingers 55 which extend through apertures 56 through the cylindrical wall 57 which is offset from a cylindrical wall section 58 which receives an enlarged edge 59 of a diaphragm 61 to be sealed therewith by the flange 54. The diaphragm 61 has an inner sleeve 62 which seals to the end of the piston 28 and the plug 34. A nut 63 secures cylindrical caps 64 and 65 to the end of the piston 28. A casting 66 is secured to the bottom flange 67 of the wall 58 by a plurality of screws 68. The wall 67 has a downwardly offset portion 69 containing a plurality of apertures 71. A screw 72 is threaded in the center of the offset portion 69 having a spring 73 thereon which retains a cap 74 against the screw head where the cap 74 supports a filter pad 75 against the surface of the deflected portion over the apertures 71. The casting 66 seals a diaphragm 76 to the bottom flange 67 of the wall 58, having ribs 77 extending downwardly therefrom to provide a degree of rigidity thereto to conpensate for discrepancies between opening and closing of valve means associated therewith. An annular flange 78 of the casting 66 engages the diaphragm 76 and forms a seal therewith. An annular sleeve 79 on the casting forms a shoulder 81 against which a cup-shaped valve 82 abuts when moved away from the diaphragm 76. A cylindrical flange 83 extends outwardly of the wall of the cup-shaped valve 82, having an annular flange 84 provided with outwardly extending projections 85 forming passageways therebetween. A spring 86 urges the valve 82 away from the diaphragm 76. The casting 66 has a tubular portion 87 to which the conduit 18 to the vacuum source is secured. The tubular element extends through an aperture in the diaphragm 76 and is joined by an aperture 88 to an area 89 about the annular flange 78. The annular flange 78 when engaging the diaphragm 76 seals off communication between the chamber 96 and the vacuum. A spiral helical spring 91 is disposed between the cap 65 and the extending sleeve 79 to apply a force to retain the piston 28 in open position as illustrated in FIGURES 2 and 3. A coil spring 92 is secured over the outer wall of the cup-shaped valve 82 to extend outwardly therefrom a predetermined amount. A coil spring 93 is secured within the cup-shaped valve 82 to extend outwardly therefrom about the cylindrical cap 64. A slot 94 in the sleeve extension 79 of the casting 66 forms an air passage to and from a chamber 96 formed by the diaphragm 61, the wall 58 and the bottom flange 67.

With the relationship of the elements as illustrated in FIGURE 2, air can pass through the filter pad 75, through a central aperture 97 in the diaphragm 76, past the annular flange 84 of the cup valve 82, through the space between the projections 81 and out the slot 94 to within the chamber 96. With the diaphragm 76 engaging the annular flange 78 the passageway 88 and that through the tube 87 to a vacuum source are cut off from the chamber.

In operation when the foot pedal 11 is depressed, fluid pressure will be delivered equally to the conduits 12 and 14. The fluid in the conduit 12 will transmit pressure to the brake cylinders of the rear wheels 13, while the fluid in the conduit 14 will transmit master cylinder pressure directly through the slots 39 of the sleeve 36 into the bore 24 and out through the conduit 16 to the brake cylinders of the front wheels 17. In other words, during the initial stages of braking, an equal pressure is applied to the brakes of the front and rear wheels. As the master cylinder pressure is increased, the forward weight shifting of the vehicle toward the front wheels makes it desirable that the braking force on the front wheels be greated than the braking force applied to the rear wheels. The increased braking force on the front wheels utilizes the increased traction between the front wheels and the ground surface and prevents premature skidding of the rear wheels which could produce "fish tailing" or loss of control of the vehicle. As more and more force is applied to the brake pedal 11, a greater force will be applied to the hydraulic fluid in the conduits 12 and 14.

When the force produced on the piston 28 by master cylinder pressure acting on an effective area equal to the cross sectional area of the small portion of the piston 28 slidable within the seal 29 exceeds the force of the spring 91, the piston 28 will advance. The piston head shoulder 46 seals against the seal 41 to close the passage therebetween. The closure of the piston head 35 against the seal 41 is indicated in the graph of FIGURE 5 by the number 98. From this point on the pressure of the fluid in the brake cylinders of the front wheels 17 will be produced by fluid as the piston 28, sleeve 36 and seal 41 move as a unit. This assembly serves to generate a higher pressure at the outlet 27 than exists at the conduit 14.

This results from the greater effective area of the piston 28 against which inlet pressure acts compared to the effective area of the piston 28 which is attempting to displace fluid to the outlet. The difference is the cross sectional area of the small diameter portion of the piston 28 slidable in the seal 29. The line 99 showing the fluid pressure on the front brakes deflects downwardly from the dot-dash line 101 which depicts the pressure which would result without the use of the device of the present invention.

The advancement of the piston 28 continues as the pressure on the foot pedal 11 increases and the cap 65 advances therewith until it engages the spring 93 whereupon the cup-shaped valve 82 will be moved downwardly to engage the diaphragm 76 and form a seal against the passage of air through the opening 97 and move the diaphragm from the annular flange 78 to establish communication with the vacuum tube 87. The air within the chamber 96 will be evacuated through the slot 94, the passageways between the projections 85, past the flange 78 and out the passageway 88 and that of the tubular element 87 to the vacuum source. This will produce a vacuum pressure within the chamber 96 for drawing the cup 65 and the piston 28 therewithin to further increase the booster pressure on the fluid in the bore 24. The beginning of this increase in booster pressure is illustrated at the point 102 of the graph. The cup-shaped valve 82 will open and close to maintain a level of vacuum in the chamber 96 determined by the spring force acting on the valve 82. As the diaphragm 61 and cup 65 advance, they will compress the spring 91. Due to the rate of the spring 93, the force acting on the valve 82 which will have to be balanced by a further evacuation of air from the chamber 96 is increased. Accordingly, the pressure generated at the front brakes is further boosted. The rate of boost remains constant until the spring 92 is engaged by the cup 65. This point is illustrated on the graph as the point 103 and thereupon a greater rate of boost is achieved due to the greater force applied to the valve 82 to retain it in contact with the diaphragm 76 so that a greater vacuum can be built up within the chamber 96. This produces a greater pull on the piston 28 and further boosts the pressure on the fluid in the bore 24 and the cylinders of the front wheel brakes. It will, therefore, be seen that the additional spring 92 achieves another stage or rate of pressure increase for the front brakes. This additional stage is desirable in order to more closely approximate the ideal curve for the relative pressurization of the brake cylinders in which full use is made of the adhesion of all wheels to the road.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A brake pressure boosting device adapted to be interposed between the master cylinder and a brake cylinder of a vehicle hydraulic brake system for front and rear sets of brakes, said device including a housing having an inlet, an outlet and a bore providing communication between said inlet and outlet, differential area piston means movable in said bore to displace brake fluid to said outlet to one set of brakes at a higher pressure than the brake fluid at said inlet to the other set of brakes, a power unit connected to said piston means, means rendering said power means effective after delivery of said high pressure for assisting said piston means in displacing brake fluid to said outlet and said one set of brakes at a still higher pressure, and control means for said power unit directly responsive to the movement of said piston means.

2. The structure set forth in claim 1 in which said power unit comprises a chamber having a diaphragm actuated by differential fluid pressure and a rod connected between said diaphragm and said piston means to be moved thereby.

3. The structure set forth in claim 1, wherein said piston means comprises a plurality of parts providing a passage therebetween for the direct transmission of fluid pressure from said inlet to said outlet when the pressure of the brake fluid at said inlet is less than a predetermined value.

4. The structure set forth in claim 2, including a spring biasing said diaphragm to a retracted position, said spring being further operable to bias said piston means against movement toward said outlet.

5. The structure set forth in claim 2, wherein said control means comprises a valve operable to alternately connect said chamber to atmosphere and a source of vacuum.

6. The structure set forth in claim 5, wherein said control means further comprises a spring disposed between said diaphragm and said valve and shorter than the space therebetween and wherein movement of said diaphragm actuates said valve through said spring when both ends are engaged, said valve being subject to the vacuum pressure on the side thereof adjacent said spring and atmospheric pressure on its opposite side.

7. The structure set forth in claim 5 wherein said control means further comprises a pair of springs of different lengths disposed in said chamber between said diaphragm and said valve and shorter than the space therebetween in position to be successively engageable by said diphragm during its movement and wherein said diaphragm operates said valve through said springs, said valve being subject to atmospheric pressure on its side opposite from said valve, whereby said valve will tend to reclose when the pressure in said chamber reaches a predetermined relationship to the force delivered to said valve by said springs.

8. The structure set forth in claim 2, wherein said control means includes a first normally closed valve element which is operable to close off said chamber from a source of nonatmospheric pressure and a second movable valve element adjacent to said first valve element which is normally operable to open said chamber to an atmospheric pressure and which will engage and open said first valve element after a predetermined amount of movement of said diaphragm.

9. The structure set forth in claim 2 and wherein said control means comprises a first movable atmospheric valve element operable by the movement of said diaphragm to admit atmospheric pressure to said chamber, a second stationary vacuum valve element which is normally operable to close said chamber to a source of vacuum and a resilient valve seat normally engageable with said vacuum valve element, said movable atmospheric valve element being movable into engagement with said resilient valve seat by movement of said diaphragm to first close said atmospheric valve and thereafter open said vacuum valve.

10. The method of boosting the braking force on the front and rear wheels in stages from an increasing application of pressure on a foot pedal which includes the steps of: initially applying like pressures on the brakes of the front and rear wheels as a first stage of braking, boosting the pressure on the fluid to one set of brakes as a second stage of braking, and further boosting the pressure on said one set of brakes as a third stage of braking to approach an ideal curve for the front and rear wheel brake pressures.

11. The method as recited in claim 10, wherein the still further increased application of foot pedal pressure further boosts the pressure on said one set of brakes as a further stage of braking.

References Cited

UNITED STATES PATENTS

| | | | |
|---|---|---|---|
| 2,207,173 | 7/1940 | Goepfrich | 303—6 XR |
| 2,308,460 | 1/1943 | Stelzer | 60—54.5 |
| 2,353,755 | 7/1944 | Price | 60—54.6 XR |
| 2,402,344 | 6/1946 | Price | 60—54.5 XR |
| 2,794,320 | 6/1957 | Rockwell | 60—54.5 |
| 2,913,877 | 11/1959 | Stelzer | 60—10.5 XR |
| 2,933,160 | 4/1960 | Van Wart et al. | 60—54.6 XR |
| 2,947,387 | 8/1960 | Price | 303—6 XR |

MARTIN P. SCHWADRON, *Primary Examiner.*

R. R. BUNEVICH, *Assistant Examiner.*